Jan. 1, 1924
H. N. PARSONS
BALL RETAINER
Filed Jan. 21, 1922
1,479,086
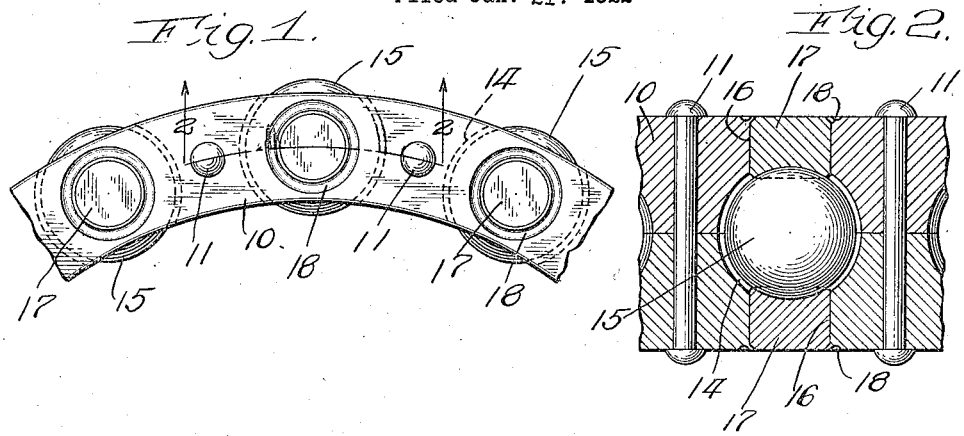
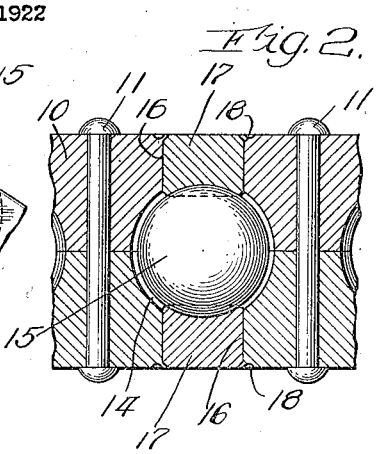
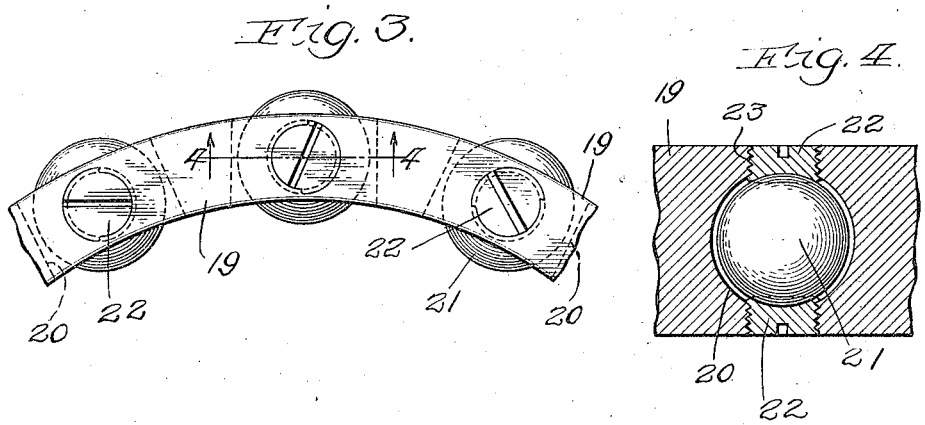
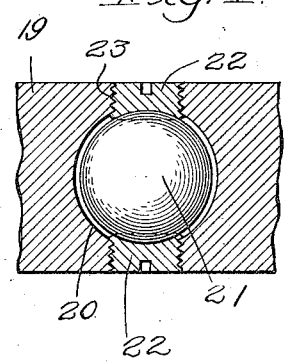
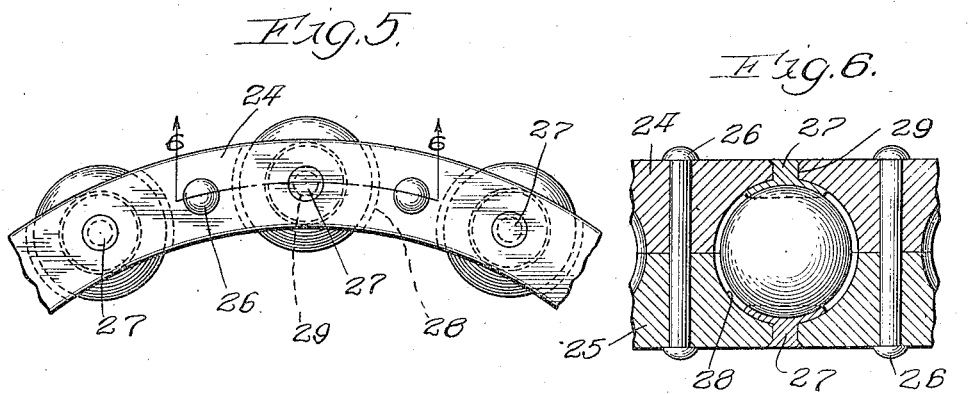
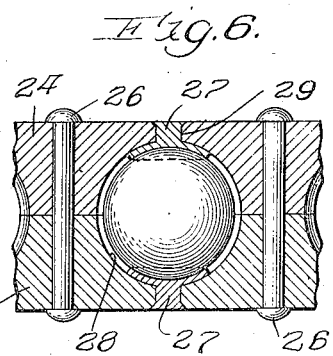
Inventor,
Harry N. Parsons.

Patented Jan. 1, 1924.

1,479,086

UNITED STATES PATENT OFFICE.

HARRY N. PARSONS, OF CHICAGO, ILLINOIS, ASSIGNOR TO U. S. BALL BEARING MANUFACTURING COMPANY, OF CHICAGO, ILLINOIS, A CORPORATION OF ILLINOIS.

BALL RETAINER.

Application filed January 21, 1922. Serial No. 530,820.

*To all whom it may concern:*

Be it known that I, HARRY N. PARSONS, a citizen of the United States, residing at Chicago, in the county of Cook and State of Illinois, have invented a new and useful Improvement in Ball Retainers, of which the following is a specification.

This invention relates to ball retainers for ball bearings and is fully described in the following specification and shown in the accompanying drawings, in which—

Figure 1 is a partial front elevation of one embodiment of the invention with balls assembled therein;

Fig. 2 is a partial section on the line 2—2 of Fig. 1;

Figs. 3 and 4 are views similar to Figs. 1 and 2, respectively, showing a modified form of the invention; and Figs. 5 and 6 are similar views of another modification.

Figs. 1 and 2 show a form of retainer having a ring made up of two members 10 placed side by side and secured together by rivets 11. These members have registering hemispherical recesses 14, adapted to receive balls 15.

Transverse holes 16 are made concentric with the center of the openings 14 and on the axes of rotation of the balls 15. Plugs 17, which may be made of metal, lignumvitæ, antifriction compounds and the like, are fitted into the transverse holes 16, the inner ends being cut so as to accurately fit the balls 15. After inserting these plugs in the holes 16, the space about the hole is peened at 18 so as to retain the plug therein.

The recess 14 is made somewhat larger than the ball, so as to insure that it will not touch the sides of the recess as it rotates. By engaging the ball only at its axes, friction of the ball is greatly reduced and a freer-running bearing results. If the balls 15 become loose, due to wearing of the plugs 17, they may be tightened by driving these plugs toward the ball and securing them in this newly adjusted position by further peening the points 18.

In Figs. 3 and 4 is shown a modification in which the ring 19 is made from an integral piece of metal having openings 20 drilled radially therethrough. Balls 21 are retained therein by means of threaded plugs 22, which are screwed into small threaded openings 23. These plugs likewise lie on the axis of the ball retained and may be adjusted at any time, turning with respect to the ring, and if desired may be locked by slightly peening the ring about the edges of the plug.

Figs. 5 and 6 show still another modification having a ring made up of two members 24 and 25 secured together by means of rivets 26, in much the same way as the form shown in Figs. 1 and 2. In this case, plugs 27 are inserted from the inside of the openings 28, through holes 29 and are riveted over on the outside.

While this retainer is shown only as applied to retainers for radial bearings, it is apparent that it is applicable to retainers for thrust bearings.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A ball retainer for ball bearings comprising a ring having recesses therein for the balls and bearing members secured in the sides of said recesses and adapted to contact with said balls at their axes, said bearing members being secured in holes in the sides of said recesses.

2. A ball retainer for ball bearings comprising a ring having recesses therein for the balls and bearing members secured in the sides of said recesses and adapted to contact said balls at their axes, said bearing members being replaceable.

3. A ball retainer for ball bearings comprising a ring having recesses therein for the balls and bearing members secured in the sides of said recesses and adapted to contact with said balls at their axes, said bearing members being adjustable on the axes of said balls.

HARRY N. PARSONS.